Sept. 13, 1938.  T. M. KING ET AL  2,129,845
ELECTRIC WELDING MACHINE
Filed Sept. 11, 1936  5 Sheets-Sheet 1

FIG. 1

INVENTORS
T. M. KING
L. STASTNEY
BY H. A. Whitehorn
ATTORNEY

Patented Sept. 13, 1938

2,129,845

UNITED STATES PATENT OFFICE 2,129,845

ELECTRIC WELDING MACHINE

Thomas M. King, Hinsdale, and Ladislav Stastney, Cicero, Ill., assignors to Western Electric Company, Incorporated, New York, N. Y., a corporation of New York Application September 11, 1936, Serial No. 100,266

10 Claims. (Cl. 140—144)

This invention relates to electric welding machines, and more particularly to equipment for welding contacts to switch springs or other elements of electrical apparatus.

In the manufacture of electrical equipment it is sometimes desirable to use gold, silver, palladium or other noble metals for contacts on members employed to control electrical circuits. For example, the application of these metals on the contacting portions of certain electrical switches in communication apparatus, improves the reliability and operation of the equipment. Because these metals are costly, it is desirable to restrict their use and to apply the metal accurately, securely and rapidly to the contacting surfaces on the switch elements for maximum utility and economy.

An object of this invention is to provide an improved apparatus for welding material accurately and economically.

In accordance with one embodiment of this invention an electric welding machine is provided in which a continuous strip of contact metal is advanced intermittently through a guide passage to a pair of hinged jaws pivotally mounted adjacent to a pair of electrodes. A portion of the strip is fed between the jaws which are clamped together to grip the stock and then rotated to shear a section or contact from the strip. The jaws then carry the severed contact into a position in advance of a pusher rod which unclamps the jaws and delivers the contact to the welding position on a spring member placed between an upper and lower electrode which are compressed against the spring and the contact to weld the parts and complete the operation.

Other features and advantages of the invention will more fully appear from the following detailed description taken in conjunction with the accompanying drawings, wherein.

Figure 1:
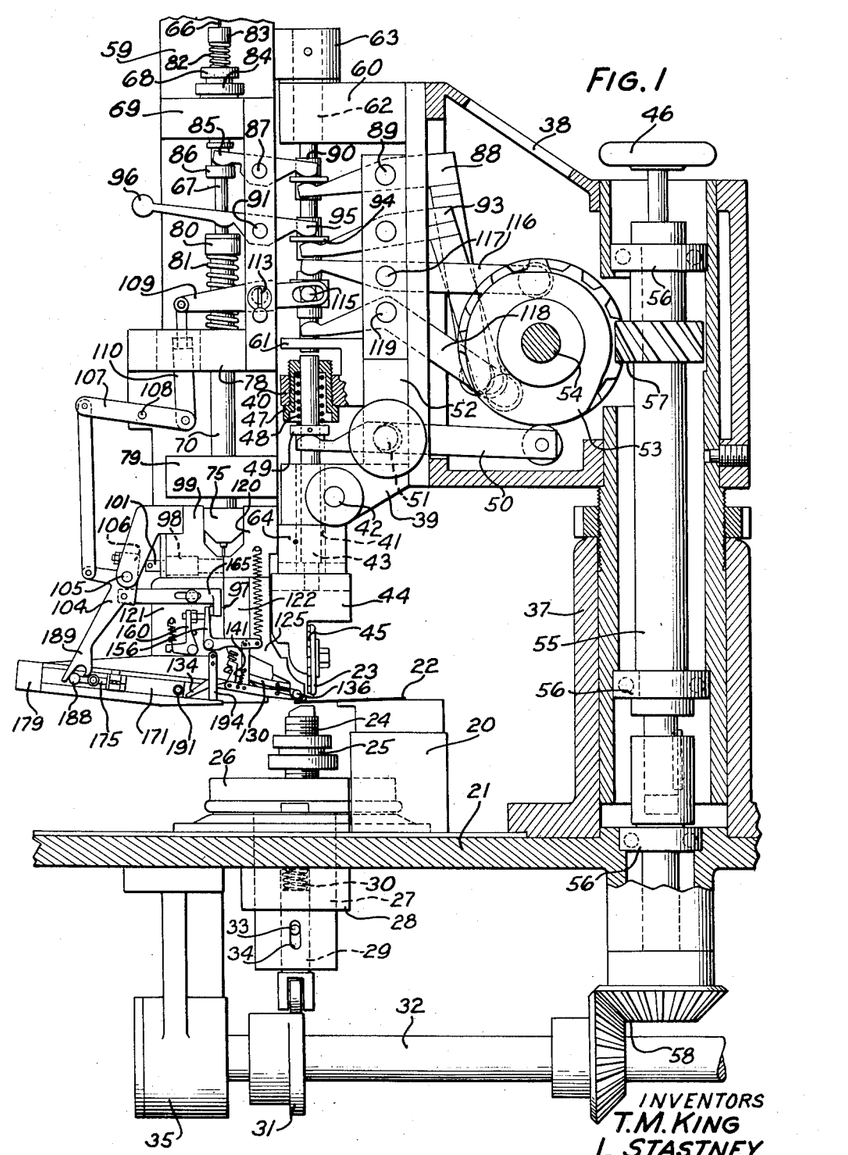
Fig. 1 is a fragmentary side view, partly in section, of a welding machine embodying the features of this invention.

Referring now to the drawings, and particularly Fig. 1, a fixture 20 of suitable contour is mounted on top of a machine base 21 for supporting a switch spring 22 or other part on which a contact is to be welded. In the welding position, the left end of the part extends from the fixture between an upper electrode 23 and a lower electrode 24 which are adapted to clamp the contact and spring between them and weld the parts together.

The lower electrode which is made of copper is adjustably mounted with a threaded collar 25 on a lower electrode support 26. The support has a cylindrical shank 27 slidably mounted in a bearing 28 in the machine base. The electrode is reciprocated by a cylindrical rod 29 which engages a compressible spring 30 recessed in the support shank at its upper end and an eccentric cam 31 on a main drive shaft 32 at its lower end. The relative movement of the electrode support and the rod is limited by a stud 33 projecting from the rod into an elongated slot 34 in the shank wall. The main drive shaft is supported in bearings 35 secured to the bottom of the base and connected to an electric motor or other driving means through a conventional clutch (not shown).

The upper electrode and mechanism for feeding the contact to the part are supported on a hollow column 37 mounted on the machine base to the right of the jig. A housing 38 extends from the top portion of the column to the left over the base for enclosing the driving mechanism. Extending from the left end of the housing and aligned vertically with the electrodes are two brackets 39 and 40 for supporting the upper electrode. The lower of these brackets is split and clamped against a tubular sleeve 41 by means of a flanged bolt 42. Longitudinally slidable in the sleeve is an upper electrode actuating rod 43 which carries at its lower end an offset member 44 to which the disk-shaped copper electrode is secured by means of a bolt. The upper electrode has a series of peripheral notches 45 for receiving the contact and is rotatably adjustable on its support to permit proper alignment. The upper end of the electrode supporting rod is slidably supported in a recessed bearing 47 which is threaded into the upper electrode bracket. A coiled spring 48 is compressed in the bearing recess against a collar 49 pinned to the electrode rod for retaining the rod yieldably against an upper electrode operating lever 50 engaging the under surface of the collar. The lever is fulcrumed on a pivot 51 in a bracket 52 projecting from the mechanism housing and is actuated by a stepped cam 53 keyed to a cam shaft 54 supported in the mechanism housing. The pivot 51 is eccentric for adjusting the position and travel of the lever.

The cam shaft is rotated by a vertical drive shaft 55 mounted on bearings 56 in the hollow column 37 through a worm and worm wheel 57. The vertical shaft extends down through the base and is connected to the main drive shaft 32 through a pair of bevel gears 58. A hand wheel 46 extends from the top of the vertical drive shaft for manual operation of the mechanism. The position of the upper electrode is controlled by its operating lever driven from the cam shaft which at an appropriate time lowers the electrode under pressure of the compressed spring in the recessed bearing to firmly engage a contact positioned in the electrode notch and maintain the contact under suitable pressure during the welding operation. The welding pressure is adjusted by moving the recessed bearing in its threaded support.

The mechanism for feeding, shearing and delivering the contact to the electrode is supported on an elongated feeding mechanism frame 59 mounted to the left of the upper electrode. The frame and the upper electrode are made adjustable relative to the axis of the part in the fixture to permit adjustment of the contact position. Above and aligned with the electrode brackets are two additional brackets 60 and 61 on the mechanism housing for rotatably supporting a cylindrical rod 62. The frame is secured to an enlarged collar 63 pinned to the top of this rod and a similar collar 64 which is pinned to the sleeve 41 in which the upper electrode actuating rod is bearinged. The electrode support 44 is keyed by suitable means not shown to the collar 64. To change the position of the upper electrode and contact feeding mechanism, the split portions of the sleeve bracket are released and the upper electrode and feeding mechanism frame rotated on the rod and sleeve to locate the contact at any required angular position on the part.

Figures 2, 3, 5, 6:
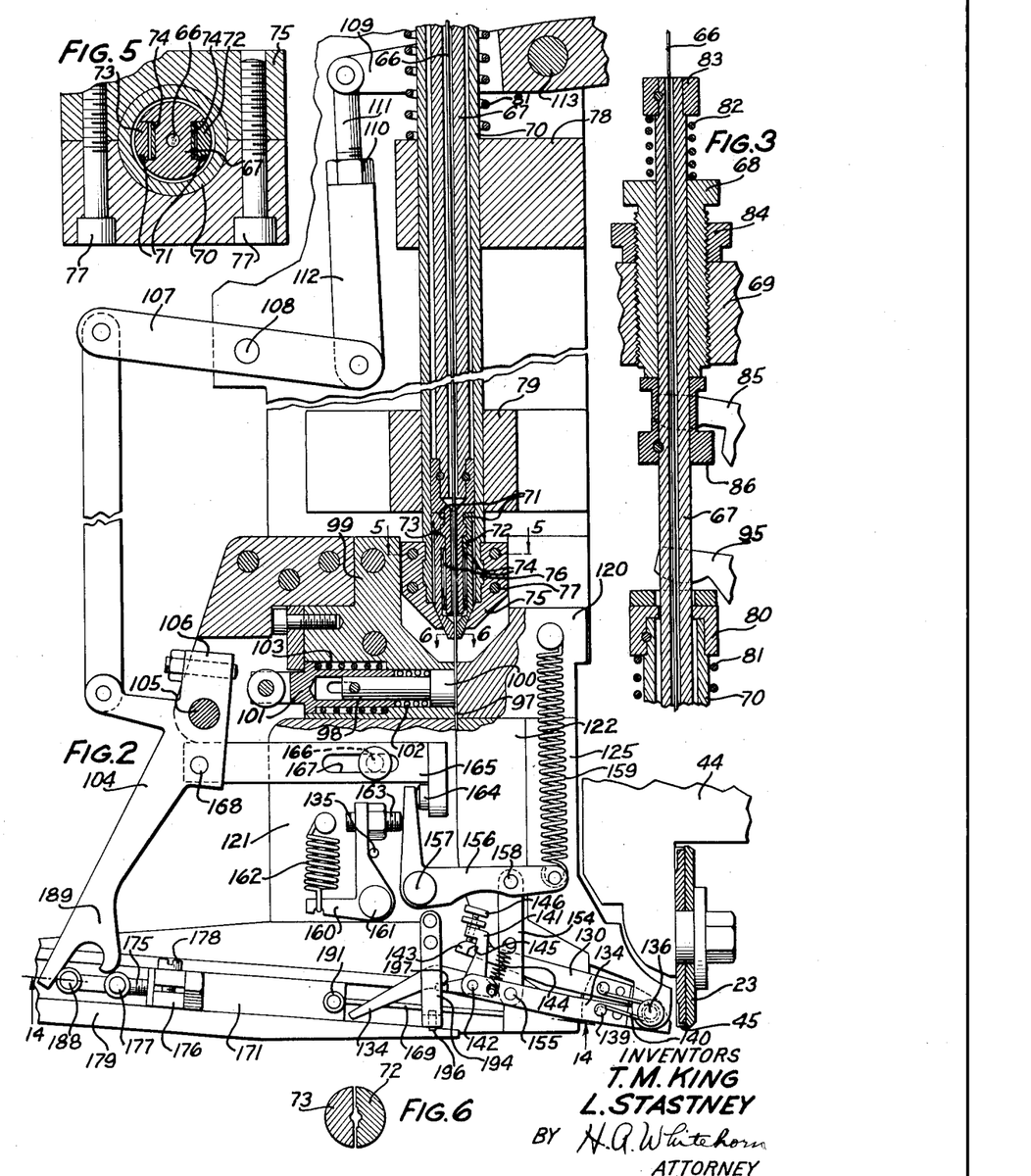
Figs. 2, 3 and 4 are enlarged views, partly in section, of portions of the apparatus shown in Fig. 1.
Figs. 5 and 6 are enlarged sections taken on the lines 5—5 and 6—6, respectively, of Fig. 2.

The contact metal is introduced to the machine in the form of a continuous strip or tape 66 of suitable cross-section for satisfactory welding and service. The strip may be bi-metallic and is rolled or otherwise formed into the required cross-section. As shown in Figs. 2 and 3 the strip is threaded through a hollow feed spindle 67 which is slidably supported in a bearing 68 threaded into a frame bracket 69 and a plunger sleeve 70 encircling the lower portion of the spindle. Cooperating members on the bottom ends of the spindle and plunger sleeve comprise a collet chuck for engaging and advancing the contact metal strip in accordance with the relative positions of the spindle and sleeve. Mounted in longitudinal peripheral grooves 71 (Fig. 5) in the end portion of the spindle are two chuck jaws 72 and 73 having their inside surfaces formed to the cross-sectional contour of the strip (Fig. 6). A leaf spring 74 is mounted in each spindle groove underneath each jaw to urge the jaws out of engagement with the strip. Encircling the jaws is a split cone 75 held on a keyed portion 76 of the plunger sleeve with screws 77. The peripheral surfaces of the jaws and the inner surface of the cone have corresponding tapers and the jaws extend through an opening in the bottom of the cone.

The plunger sleeve is vertically movable in bearing brackets 78 and 79 projecting from the frame. Surrounding its upper end and compressed between an annular flange 80 on the sleeve and the upper bracket is a coiled spring 81 normally holding the sleeve in its upper position in which the cone compresses the chuck jaws against the strip. The feed spindle is normally retained in its upper position by a spring 82 compressed between an annular flange 83 on the spindle end and the spindle bearing 68. The normal positions of the spindle and sleeve are determined by the adjustable spindle bearing which is locked with a collar 84.

The feed spindle is depressed to advance the stock by a spindle lever 85 engaging a shoulder 86 on the spindle. As shown in Fig. 1, the spindle lever is rotated on a pivot 87 in the mounting frame 59 by means of a primary spindle lever 88 fulcrumed at 89 in the housing brackets 52 and operated by a cam on the cam shaft 54. Motion is transmitted from the primary lever to the spindle operating lever through a collar 90 sliding on the vertical rod 62 on which the feeding mechanism frame and upper electrode are rotated for adjustment of contact position. The plunger sleeve is engaged by a similar lever 95 pivoted at 91 on the frame and actuated by a primary lever 93 which is fulcrumed in the bracket 52 and actuated by a cam on the cam shaft 54. Motion is transmitted between these levers through a freely sliding collar 94 on the rod 62.

In normal position the chuck jaws on the spindle are clamped against the contact metal strip by the cone on the plunger sleeve under tension supplied by the spring 81 at the top of the sleeve which urges the tapered inner surface of the cone against the correspondingly tapered peripheral surfaces of the jaws to compress the jaws against the strip. When the spindle is depressed by its lever, the sleeve also advances to hold the jaws against the strip and advance the strip a predetermined distance equal to the length of one contact. This travel, and the consequent length of the contact, is adjusted by means of the threaded spindle bearing 68. At the bottom of the feed stroke, the plunger sleeve lever is applied against the top of the sleeve to further depress it in its bearings. This removes the cone from the jaws, permitting the leaf springs underneath the jaws to release the strip while the spindle is returned to its normal or elevated position by its spring. At the end of the spindle return stroke the sleeve is released and returned to its elevated position by its spring, causing the cone to clamp the jaws against the strip, ready for the next feeding cycle. An extension 96 of the plunger sleeve lever enables the machine operator to manually release the jaws from the stock at any time while adjusting the apparatus.

The advanced portion 92 of the strip is fed into a guide channel 97 formed by a series of plates mounted on the mechanism frame. The guide channel has the same cross-section as the strip and conducts the strip downward and to the right from the feed spindle.

To hold the strip stationary during the return stroke of the feed spindle, a brake 98 (Fig. 2) is mounted in one of the formed plates 99 directly below and to the left of the collet chuck. The brake comprises a brake pad 100 which is flexibly compressed against the strip in the guide channel by a plunger 101 through an intermediate spring 102 to accommodate variations in strip contour. A second spring 103 compressed between the plunger and the plate holds the brake pad normally away from the strip.

The brake is operated by a bell crank 104 pivoted at 105 on the plate and provided with a vertical arm 106 for engaging the left end of the brake plunger. The bell crank is connected through a series of hinged links 107 pivoted at 108 in the mounting frame to a bell crank operating lever 109. The upper link 110 is adjustable having a shank 111 threaded into a sleeve 112 for regulating the position and travel of the bell crank. The bell crank operating lever (Fig. 1) is hinged on a pivot 113 in the feeding mechanism frame with its end opposite the adjustable link flexibly keyed to a collar 115 which is freely movable on the vertical rod 62. Engaging the top of this collar is a primary lever 116 hinged at 117 in the bracket 52 and actuated from the cam shaft 54. Another primary lever 118 also pivoted at 119 on the bracket 52 and operated by a cam on the cam shaft engages the bottom of the sliding collar. By means of these levers the bell crank is moved positively in two directions.

Figures 8, 9:
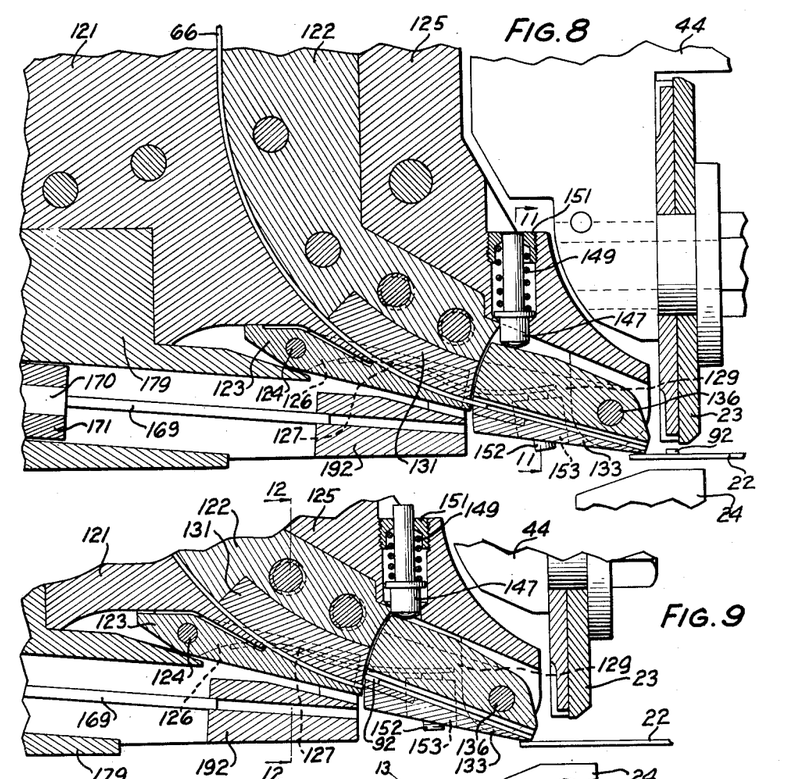
Figs. 8, 9 and 10 are enlarged detailed vertical sections of a portion of the apparatus of Fig. 4 showing the positions of the component members at various stages of the operating cycle.
Figure 10:
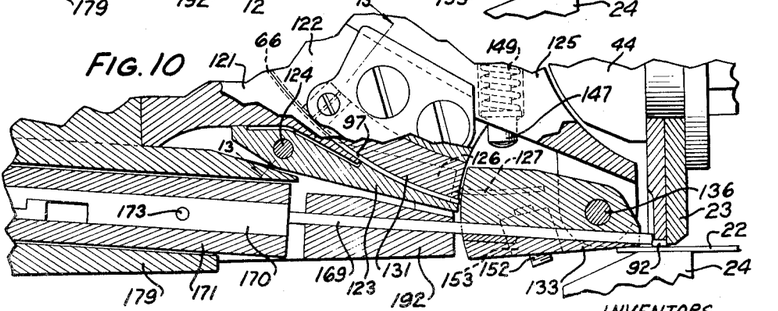

The upper right portion of the guide channel opposite the brake is formed by a plate 120 (Fig. 2) cooperating with plate 99 and the lower portion is formed by a left hand plate 121 and a right hand plate 122. The guide channel formed by these plates terminates at its lower end in a pair of hinged jaws mounted between the channel and the upper electrode to shear the contact from the strip and conduct the severed contact to the electrode groove. The lower end portion 123 of the feed channel adjacent to the shear jaws is pivoted on a pin 124, as shown in Figs. 8, 9 and 10. An insert 131 in the plate 122 forms the upper part of the feed channel at this point. The hinged portion (Fig. 18) has an offset 126 from which a leaf spring 127 extends beyond the right end of the guide channel for engaging the shear jaws and clamping the hinged portion against the strip during the shearing operation.

Figures 15, 16, 17, 18, 19:
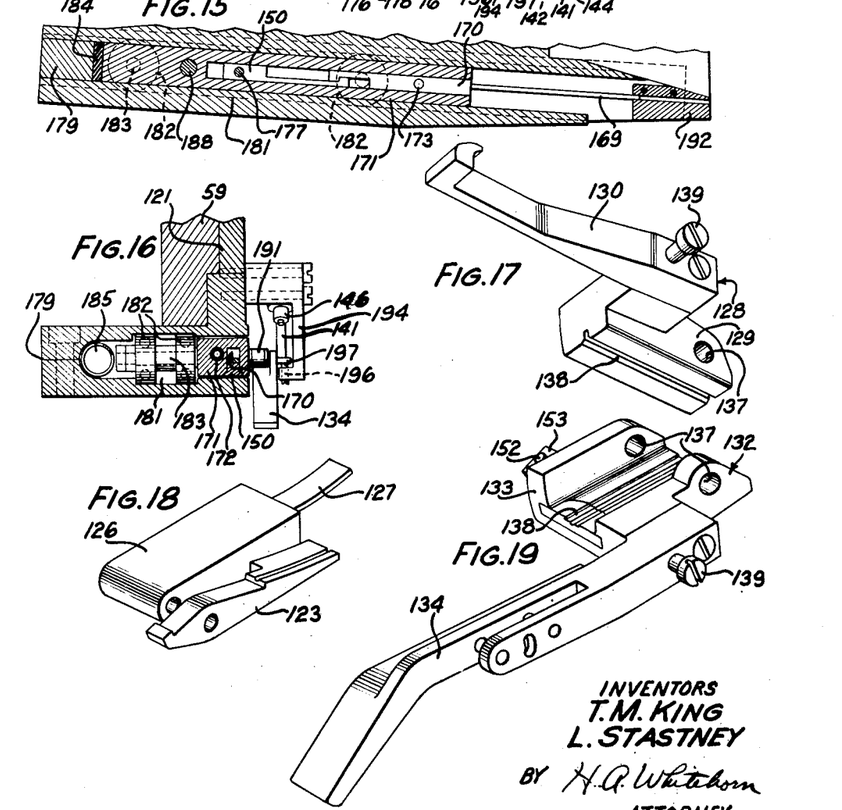
Figs. 15 and 16 are sections taken on the lines 15—15 and 16—16 of Fig. 14, respectively.
Figs. 17, 18 and 19 are perspective views of operating members shown in Fig. 8.

The construction of the shear members is shown in Figs. 17 and 19 and their installation and operation are illustrated in Figs. 8, 9 and 10. An upper shear jaw 128 (Fig. 17) has a body 129 and an elongated offset operating arm 130. A lower shear jaw 132 (Fig. 19) has a channel-shaped body 133 adapted to receive the upper jaw body and an offset operating arm 134. The jaws are hinged with their body portions nested on a cylindrical pin 136 engaging aligned openings 137 in the jaw bodies and mounted in a plate 125 adjacent to the upper electrode. Cooperating longitudinal grooves in the two jaw bodies provide a channel 138 of suitable cross-section for receiving and conducting the contact.

Extending from each jaw operating arm near the pivot end is a stud 139 between which a coiled spring 140 (Fig. 4) wrapped around an extension of the shear jaw pivot is compressed for normally holding the jaws slightly spaced to receive the contact.

Figure 11:
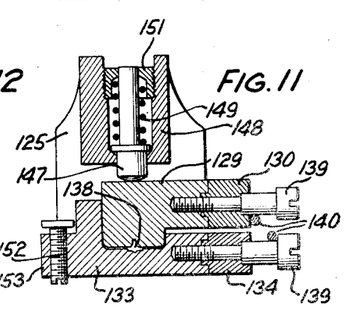
Fig. 11 is a section of Fig. 8 taken on the line 11—11.
Figure 12:
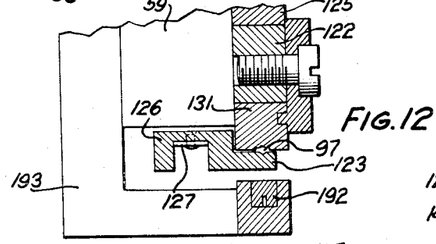
Fig. 12 is a section of Fig. 9 taken on the line 12—12.
Figure 13:
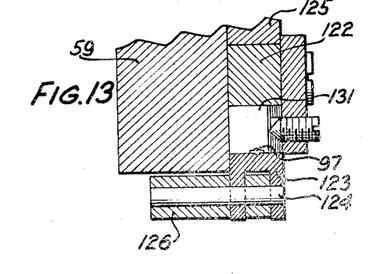
Fig. 13 is a section of Fig. 10 taken on the line 13—13.

Spacing of the jaws is regulated by a latch 141 pivoted at 142 on the lower jaw operating arm and adapted to engage a lug 143 on the upper jaw arm under tension of a coiled spring 144. The lug is engaged by a notch 145 and an adjustable stud 146 on the latch member at different parts of the cycle. Above the left end of the upper jaw is a stop 147 (Figs. 8 and 11) supported in a bearing 148 in the plate 125 under pressure of a coiled spring 149 retained by a threaded cap 151 in the bearing. The leaf spring 127 extending from the hinged lower portion of the guide channel is engaged by a screw 152 in a shoulder 153 on the rear of the lower shear jaw.

Figure 4:
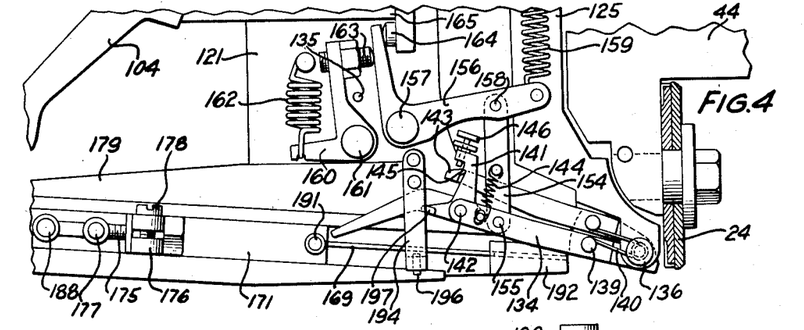
Figure 7:
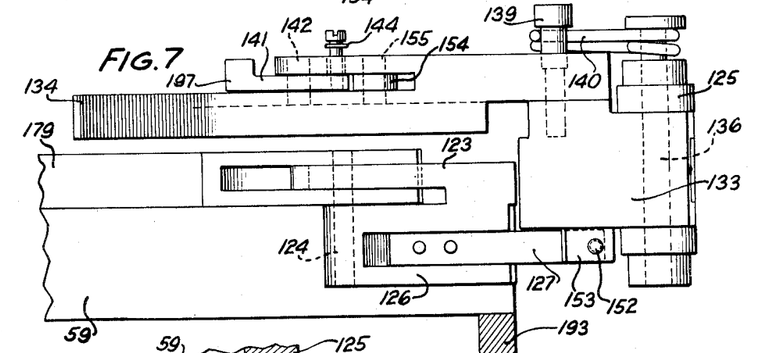
Fig. 7 is a plan view of a portion of Fig. 4.

Mechanism for rotating the jaws upward on their supporting pin to shear the contact from the strip is applied to the lower jaw operating arm. As shown in Figs. 2 and 4 the lower jaw arm is connected through a link 154 on a pin 155 in the arm to a right angle lever 156 fulcrumed on a pivot 157 above the jaws. At the outer end of the horizontal lever leg to which the link is pinned at 158 is a tensioned spring 159 tied to the plate 120. Compressed against the left side of the vertical lever leg is a crank arm 160 provided at 161 on the plate 121 and actuated by a tensioned spring 162 which is relatively stronger than the spring 159 and holds the crank arm normally against a stop 135 projecting from the plate. The crank arm engages the right angle lever through a stud 163 threaded into the arm and the stud is adjusted to locate the normal position of the jaws. The right side of the right angle lever vertical leg engages a shoulder 164 on an elongated horizontal bar 165. The bar is longitudinally slidable on a pin 166 engaging an elongated slot 167 in the bar and is connected at its left end opposite the shoulder to the bell crank lever 104 by means of a pin 168.

Figure 14:
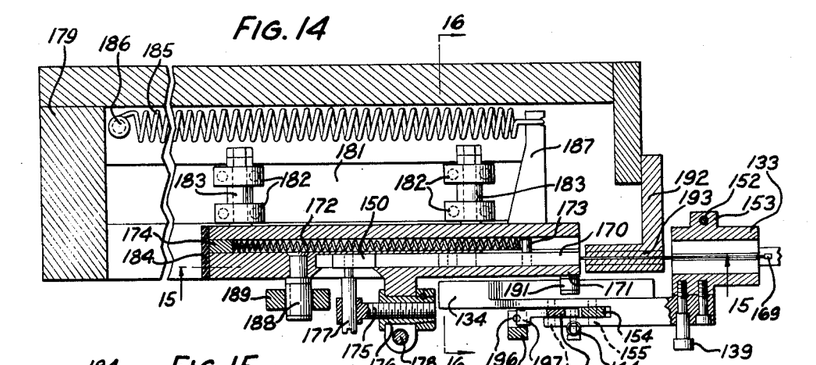
Fig. 14 is a substantially horizontal sectional view taken on the line 14—14 of Fig. 2.

Below the guide channel and to the left of the shear jaws a longitudinally movable feed finger 169 is mounted for delivering the severed contact through the channel in the jaws into the electrode slot. The feed finger has a small cross section and projects from the end of a feed finger carrier 170 (Figs. 14 and 15) which is slidably mounted in a holder 150. The holder is adjustably secured in a supporting member 171 by means of a stud 177 projecting from the holder which engages a screw 175 threaded into a slit yoke 176 on the supporting member. A compressible spring 172 is interposed between the feed finger and its supporting member by engagement with a shoulder 173 on the carrier and a flange 174 on the supporting member to hold the members extended and their normal relative positions are established by the screw 175 which is clamped in the split yoke with a screw 178 to hold the members accurately in the adjusted position.

The feed finger carrier supporting member 171 is slidably supported in a housing 179 secured to the bottom of the mechanism frame 59. Top and bottom portions of the housing cooperate (Fig. 16) to form a longitudinal runway 181 for ball bearings 182 mounted on shafts 183 projecting from the feed finger carrier support. The feed finger assembly is held in its normal position at the left end of the housing against a fiber stop 184 by a tensioned spring 185 having one end secured at 186 to the housing and the other end tied to an arm 187 projecting from the right rear end of the carrier support.

Projecting from the left front of the feed finger carrier supporting member through the open front of the housing is a rotatable collar 188 for engaging a fork 189 on the bell crank lever 104 (Fig. 2) which advances the feed finger into the jaws. Projecting from the right front of the supporting member is a stud 191 (Fig. 14) to engage the lower jaw operating arm and align the feed channel in the jaws with the advancing feed finger. The feed finger is flexible due to its thin section and relatively long length and is aligned accurately with the channel in the jaws by a bushing 192 in a bracket 193 at the right end of the feed finger mechanism housing. Near the right end of the feed finger mechanism housing a vertical bracket 194 (Fig. 4) is bolted to the mounting plate 121. At the bottom of the bracket is an adjustable stud 196 for engaging a projection 197 on the jaw latch 141 and releasing the latch as the feed finger advances.

In the operation of the apparatus the switch spring or other part is placed on the jig with its left end, on which a contact is to be welded, extending between the upper and lower electrodes which are spaced apart to facilitate positioning of the part. The strip of contact material is introduced to the machine from a supply roll (not shown) and threaded through the hollow feed spindle and the guide channel below the spindle. At the beginning of the operation the end of the strip is located at the left end of the shear jaws.

The operating cycle is introduced by engaging the main drive shaft with the power source, which drives the connected vertical shaft and the cam shaft, causing the cams to pivot the actuating levers in timed relation. At the beginning of the cycle, the feed spindle and associated plunger sleeve are depressed to advance the strip through the guide channel a distance equal to the length of the one contact, as previously described.

The advanced portion of the strip is fed into the passage in the shear jaw bodies which at this stage are aligned with the guide channel as shown in Fig. 8. The jaws are held slightly spaced by the spring 140 compressed between them with the latch stud 146 engaging the lug 143 on the upper arm so that the advancing strip is readily fed into the jaw grooves. The studs are positioned accurately by adjustment of the stud on the crank arm 160 which locates the right angle lever and link connecting the lever to the lower jaw arm.

After the feed spindle reaches the bottom of its stroke the associated plunger sleeve is further depressed by its operating lever to release the feeding jaws from the strip, as previously explained. Simultaneously, the lower primary bell crank lever 118 is rocked by its cam to raise the sliding collar 115 on its shaft, rotating the link operating lever 109 in a counterclockwise direction, and the bell crank 104 in a clockwise direction on its pivot 105. During this motion the vertical arm 106 on the bell crank engages the brake plunger 101 to compress the brake pad firmly against the strip. The braking action is applied through the spring compressed between the plunger and the pad to accommodate strip of varying thickness.

Clockwise rotation of the bell crank also moves the elongated bar 165, which is pinned to the crank below the crank pivot, to the left, rocking the right angle lever 156 in a counterclockwise direction to pivot the shear jaws upwards through the link connecting the lever and the lower shear jaw operating arm 134. Initial motion of the jaws clamps the hinged lower end portion 123 of the guide channel against the strip through the leaf spring 127 which engages the screw 152 projecting from the lower jaw. The screw is adjusted in its support to insure clamping of the strip during early motion of the jaws. The nested upper and lower shear jaws are clamped against the portion of the strip extending into the jaw channel by the spring depressed stop 147 applied against the top of the upper jaw. As the jaws rotate upwards the advanced portion of the strip is sheared from the strip and gripped between the jaws as shown in Fig. 9. During their upward travel the jaws are further compressed by the spring depressed stop, permitting the jaw latch spring 144 to swing the latch 141 on its pivot, causing the latch notch 145 to engage the lug 143 on the upper arm and hold the severed contact securely.

During the shearing stroke of the jaws the feed spindle and sleeve are returned to their upper positions with the feed chuck jaws removed from the strip, as previously described. At the same time the upper and lower electrodes are moved towards the part in the jig. The lower electrode cam 31 raises the rod 29 to compress the spring in the support shank and elevate the electrode against the part. Simultaneously, the upper electrode operating lever 50 is pivoted by its stepped cam on the shaft 54 in a counterclockwise direction sufficiently to lower the electrode under pressure of the electrode spring 48 to an intermediate position in which it lightly engages the part in the jig.

At the termination of the shearing stroke of the jaws, the lower primary bell crank operating lever 118 is released, restoring the bell crank, brake and shearing jaws to their normal positions. During this motion the jaws are held firmly against the severed contact by the jaw latch.

As the next step in the cycle, the upper primary bell crank operating lever 116 is pivoted against the top of the sliding collar 115 to rotate the link actuating lever 109 in a clockwise direction. This moves the bell crank 104 in a counterclockwise direction causing the fork 189 to engage the collar 188 projecting from the feed finger carrier supporting member 171 and move the entire feed finger assembly to the right on its ball bearings in the longitudinal runway 181.

As the feed finger carrier support advances, the roller stud 191 projecting from the forward front of the support engages the inclined end portion of the lower jaw operating arm and pivots the jaws downwards to the position shown in Fig. 10. This motion rotates the right angle lever 156 linked to the arm in a clockwise direction and the spring 159 tensioned to the horizontal leg of the lever holds the lower jaw operating arm in close engagement with the roller stud. The counterclockwise movement of the bell crank shifts the elongated bar 165 to the right sufficiently to clear the pivoted position of the vertical leg of the right angle lever. Near the end of this downward motion of the jaws the projection 197 on the jaw latch engages the stud 196, causing the latch to rotate in a clockwise direction to release the notch 145 and engage the stud 146 on the upper jaw arm lug. This permits the spring 140 compressed between the jaws to space them slightly and release the severed contact supported in the jaw channel.

In the depressed position of the jaws shown in Fig. 10, the contact channel in the jaws is aligned with the advancing feed finger 169, guided by the adjacent bushing 192, and the peripheral notch in the upper electrode. The advancing finger pushes the contact through the channel into the welding position in the electrode groove.

The flexible feed finger conforms readily to slight irregularities in the path through the jaws and the compressible spring 172 between the feed finger and the actuating member 171 prevents damage in the event that the passage becomes obstructed or the jaws inaccurately positioned.

After the contact is deposited in the electrode notch, the bell crank is restored to normal by the cam shaft. This moves the fork 189 to the left and permits the tensioned spring 185 to move the feed finger assembly to the left and withdraw the finger from the jaws after which the jaws are restored to their normal positions by the spring 159 on the horizontal leg of the right angle lever.

As the feed finger is withdrawn, the upper electrode lever is pivoted further in a counter-clockwise direction to lower the electrode to the welding position in which the contact is clamped tightly against the part under the adjustable pressure of the upper electrode spring.

Welding current is then introduced to the electrodes from a suitable source through flexible leads and controlled by a switch operated from the horizontal drive shaft. The welding circuit is not shown but well known apparatus can be used for supplying and controlling the welding current. The mechanism disclosed in U. S. Patent 2,024,597, issued December 17, 1935, to C. L. Pfeiffer is particularly suitable for this purpose.

Although the invention has been disclosed and described as applied to a specific application, other embodiments and modifications are feasible, and it is to be understood that the invention is limited only by the scope of the appended claims.

What is claimed is:

1. In an apparatus for severing and feeding strand material, a pivot, a pair of elongated jaws mounted on the pivot with the pivot at one end of the jaws, means for advancing the strand material intermittently between the unpivoted ends of the jaws in their normal position, means for moving the jaws on the pivot to a second position to cut the advanced material, means for clamping the jaws against the cut portion of the material, means for moving the jaws and the cut material to a third position, and means for removing the cut material from the jaws in the third position.

2. In a strand feeding and severing apparatus, a base, a pair of relatively movable jaws mounted on the base, a plurality of plates mounted on the base forming a guide channel for conducting the strand to the jaws, a hinged end portion on one of the plates adjacent to the jaws, means for advancing the strand through the channel and between the jaws, means for moving the jaws to shear the advanced portion from the strand, and means operated by the jaws for clamping the hinged end portion of the guide plate against the strand during the shearing operation.

3. In a strand feeding and severing device, a base, a pivot on the base, a pair of jaws on the pivot for engaging the strand, a plurality of plates mounted on the base and forming a guide channel to conduct the strand to the jaws, a hinged member secured to one of the plates for forming the end portion of the guide channel adjacent to the jaws, a resilient arm secured to the hinged member and extending parallel to the jaws, means for advancing the strand intermittently in the channel and between the jaws, means for pivoting the jaws to shear the advanced portion from the strand, and a lug on the jaws for engaging the resilient arm when the jaws are pivoted to clamp the hinged member against the strand during the shearing operation.

4. In a strand feeding and shearing apparatus, a pivot a pair of elongated jaws mounted on the pivot with said pivot at one end thereof, said jaws cooperatively providing a guide channel formed to the cross sectional contour of the strands, means for advancing the strand intermittently into the guide channel in the jaws with the jaws in their normal position, means for pivoting the jaws to shear the advanced portion from the strand, a spring depressed latch pivoted on one of the jaws, a lug on the other jaw for engagement by the latch when the jaws are pivoted to clamp the severed member of the strand in the jaws, and means for pivoting the jaws to deliver the severed strand to a desired position.

5. In a strand severing and feeding apparatus, a base, a plurality of plates mounted on the base and forming a guide passage for the strand, means for advancing the strand intermittently in the guide passage, a pivot, a pair of elongated jaws mounted on the pivot and positioned adjacent to the guide channel to receive the advanced portion of the strand when the jaws are in their normal position, means for pivoting the jaws upwardly to shear the strand, a latch on the jaws for clamping the jaws against the sheared portion of the strand, means for pivoting the jaws downwardly to transfer the severed strand, and a reciprocating member aligned with the lowest position of the jaws for unlatching the jaws and moving the sheared strand through the jaws.

6. In a strand feeding and severing device, a pivot, a lower jaw having a channel shaped section mounted on the pivot, an upper jaw mounted on the pivot and having a body nested in said channel, the adjacent surfaces of said jaws being grooved to cooperatively form a guide passage for the strand and the pivot being located at one end of the jaws, a fixed guide channel for the strand adjacent to the unpivoted ends of the jaws, an operating arm on the lower jaw for positioning and moving the jaws on the pivot, a spring compressed between the unpivoted ends of the jaws to normally hold said ends spaced slightly apart, means for advancing the strand a predetermined distance through the fixed channel and into the guide passage in the jaws when the jaws are spaced apart by the spring in their normal position, means for moving the jaw operating arm upwardly, and a spring depressed plunger mounted over the upper jaw for compressing the jaws against the strand during their upward movement and causing the jaws to shear the strand at the juncture between the fixed guide passage and the ends of the jaws.

7. In a strand feeding and severing device, a pivot, a lower jaw having a channel shaped section mounted on the pivot, an upper jaw mounted on the pivot and having a body adapted to nest in said channel, the adjacent surfaces of said jaws being grooved to cooperatively form a guide passage for the strand, a fixed guide passage for conducting the strand to the jaws, an operating arm on the lower jaw for positioning and moving the jaws on the pivot, a spring compressed between the jaws to normally hold them spaced slightly apart, means for advancing the strand a predetermined distance through a fixed passage and into the guide passage formed by the jaws when they are in normal position, means secured to the jaw operating arm for pivoting the jaws upwardly, a spring depressed plunger for engaging the upper jaw during said movement and compressing the jaws against the strand to shear the strand at the juncture between the fixed guide passage and the ends of the jaws, a slide mounted below the fixed passage, an elongated finger on the slide having a cross section the same as the passage in the jaws, means for moving the jaw operating arm downwardly to align the jaw passage with the finger, and means for advancing the finger into the jaw passage to move the severed strand through the jaw passage.

8. In a strand severing and feeding device, a base, a plurality of plates fixed to the base to cooperatively form a guide channel for the strand, means for intermittently advancing the strand into one end of the channel, and means mounted at the other end of the channel for severing the advanced length from the strand and transferring the severed portion to a predetermined position comprising a pivot, an upper and a lower jaw mounted on said pivot with the pivot at one end thereof, the unpivoted ends of the jaws being normally spaced apart and aligned with the guide channel to receive the advanced strand, an actuating arm connected to the lower jaw, means for moving the arm to pivot the jaws upwardly, a spring depressed plunger mounted in the base for engaging the upper jaw during the upward movement and compressing the jaws against the strand to shear the advanced portion therefrom, a lug on the upper jaw, a spring depressed latch on the lower jaw adapted to engage said lug during the shearing movement and lock the severed strand in the jaws, means for moving the actuating arm to pivot the locked jaws and contained strand downwardly to a position below the guide channel, a slide positioned below the guide channel having an elongated finger aligned with the jaws in their down position, means for advancing the finger between the jaws, and a stud on the finger for engaging the jaw latch as the finger is advanced to release the severed strand for movement by the finger.

9. In a strand severing and feeding device, a reciprocating spindle having a collet chuck at one end thereof for engaging the strand, a fixed guide passage for the strand mounted below the chuck, a pivot adjacent to the passage, a pair of nested jaws mounted on the pivot, a slide positioned below the passage, an elongated finger on the slide, and an actuating means for depressing the spindle and chuck to advance the strand a predetermined distance through the passage and between the nested jaws, pivot the jaws to shear the advanced length from the strand, pivot the jaws containing the severed strand to align them with the slide finger, and advance the finger between the jaws to remove the severed strand in sequence.

10. In a strand feeding device, a reciprocating spindle having a collet chuck at one end thereof for engaging the strand, a pivot, a pair of jaws mounted on the pivot for shearing the strand, a slide adjacent to the jaws an elongated finger on the slide for removing the sheared strand from the jaws, and a common means for actuating the spindle, chuck, jaws and slide in timed relation to advance the strand a predetermined distance, shear the advanced length from the strand and convey the sheared length to a position beyond the pivoted ends of the jaws.

THOMAS M. KING.
LADISLAV STASTNEY.

CERTIFICATE OF CORRECTION.

Patent No. 2,129,845. September 13, 1938.

THOMAS M. KING, ET AL.

It is hereby certified that error appears in the printed specification of the above numbered patent requiring correction as follows: Page 3, second column, line 25, for the word "provided" read pivoted: page 4, first column, line 45, for "studs" read jaws; and that the said Letters Patent should be read with this correction therein that the same may conform to the record of the case in the Patent Office.

Signed and sealed this 27th day of December, A. D. 1938.

Henry Van Arsdale (Seal) Acting Commissioner of Patents.